(12) United States Patent
Vrehen et al.

(10) Patent No.: US 10,863,728 B2
(45) Date of Patent: Dec. 15, 2020

(54) ILLUMINATION SYSTEM

(71) Applicant: SIGNIFY HOLDING B.V., Eindhoven (NL)

(72) Inventors: Joris Jan Vrehen, Eindhoven (NL); Vincent Stefan David Gielen, Eindhoven (NL); Georges Marie Calon, Eindhoven (NL); Willem Franke Pasveer, Eindhoven (NL); Martijn Evert Paul Jansen, Eindhoven (NL); Erik Paul Boonekamp, Eindhoven (NL); Hilbrand Vanden Wyngaert, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 461 days.

(21) Appl. No.: 14/897,499

(22) PCT Filed: Jun. 13, 2014

(86) PCT No.: PCT/EP2014/062297
§ 371 (c)(1),
(2) Date: Dec. 10, 2015

(87) PCT Pub. No.: WO2014/202465
PCT Pub. Date: Dec. 24, 2014

(65) Prior Publication Data
US 2016/0120157 A1    May 5, 2016

(30) Foreign Application Priority Data

Jun. 17, 2013 (EP) .................................. 13172221
Aug. 26, 2013 (EP) .................................. 13181696

(51) Int. Cl.
*A01K 63/06* (2006.01)
*A01K 61/80* (2017.01)
(Continued)

(52) U.S. Cl.
CPC .............. *A01K 63/06* (2013.01); *A01K 61/80* (2017.01); *F21V 23/003* (2013.01); *F21W 2131/308* (2013.01); *Y02A 40/81* (2018.01)

(58) Field of Classification Search
CPC ................................ A01K 61/80; A01K 63/06
(Continued)

(56) References Cited

U.S. PATENT DOCUMENTS

| 4,036,189 A * | 7/1977 | Neff ........................ A01M 1/08 |
| | | 119/51.04 |
| 4,059,072 A | 11/1977 | Vassallo |

(Continued)

FOREIGN PATENT DOCUMENTS

| CN | 201028449 Y | 2/2008 |
| GB | 2186013 A | 8/1987 |

(Continued)

*Primary Examiner* — Monica L Barlow
*Assistant Examiner* — Aaron M Rodziwicz
(74) *Attorney, Agent, or Firm* — Daniel J. Piotrowski

(57) ABSTRACT

An illumination system for cultivation of aquatic animals is disclosed for cultivation of aquatic animals in a volume of water, the cultivation using a feeding system defining a feeding axis in the volume of water. The system comprises at least a first illumination surface positioned in the volume of water and arranged for illuminating the feeding axis. The system also comprises a second illumination surface positioned in the volume of water and arranged for illuminating the feeding axis. The first illumination surface and second illumination surface are different surfaces arranged to illuminate the feeding axis from substantially different directions.

17 Claims, 4 Drawing Sheets

(51) Int. Cl.
*F21V 23/00* (2015.01)
*F21W 131/308* (2006.01)

(58) Field of Classification Search
USPC .......................................................... 119/267
See application file for complete search history.

(56) References Cited

U.S. PATENT DOCUMENTS

| | | | | |
|---|---|---|---|---|
| 4,553,194 | A * | 11/1985 | Bailey | A01K 75/02 |
| | | | | 362/253 |
| 5,732,655 | A | 3/1998 | Baba | |
| 6,203,170 | B1 * | 3/2001 | Patrick | A01K 79/02 |
| | | | | 362/234 |
| 7,195,368 | B2 * | 3/2007 | Heath, II | A01K 79/02 |
| | | | | 119/266 |
| 8,840,285 | B2 * | 9/2014 | Forant | F21V 17/10 |
| | | | | 362/101 |
| 9,016,240 | B2 * | 4/2015 | Delabbio | A01K 61/00 |
| | | | | 119/200 |
| 9,185,888 | B2 * | 11/2015 | Grajcar | F21V 29/58 |
| 9,345,235 | B2 * | 5/2016 | Delabbio | A01K 61/00 |
| 2012/0287603 | A1 * | 11/2012 | Forant | F21V 17/10 |
| | | | | 362/89 |

FOREIGN PATENT DOCUMENTS

| | | | | |
|---|---|---|---|---|
| JP | 2005229835 A | | 9/2005 | |
| WO | 2009066231 A2 | | 5/2009 | |
| WO | 2010016769 A1 | | 2/2010 | |
| WO | WO-2011019288 A2 * | | 2/2011 | ............. A01K 61/60 |
| WO | 2012099299 A1 | | 7/2012 | |
| WO | WO-2013090505 A1 * | | 6/2013 | ............. F21V 29/58 |

* cited by examiner

ILLUMINATION SYSTEM

CROSS-REFERENCE TO PRIOR APPLICATIONS

This application is the U.S. National Phase application under 35 U.S.C. § 371 of International Application No. PCT/EP2014/062297, filed on Jun. 13, 2014, which claims the benefit of European Patent Application No. 13172221.7, filed on Jun. 17, 2013 and European Patent Application No. 13181696.9, filed on Aug. 26, 2013. These applications are hereby incorporated by reference herein.

FIELD OF THE INVENTION

The present invention relates to the field of illumination systems for aquatic animal cultivation in water enclosures, an arrangement of such an illumination system in relation to a water enclosure and a method for providing light in a volume of water in order to improve feeding of the aquatic animals cultivated in the volume of water.

BACKGROUND OF THE INVENTION

The behavior of fish or other aquatic animals in their natural environment depends on a number of factors such as temperature, light quality, oxygen concentration, water PH. The amount of fish or the density of fish in a certain area is also strongly determined by environmental factors in that area.

Highly intensive fish cultivation takes place, depending on the species and developmental stage, in fresh water or in marine water. Currently, the majority of e.g. the on-growing Atlantic salmon production takes place in water enclosures, such as marine net cages or sea cages. Generally fish have a natural tendency to avoid a high light intensities such as available near a water surface. However, the drive to eat is stronger than the tendency to avoid the high light intensity close to these water surface. Feeding the fish in water cages is presently done using feeders that spread feed pallets at the water surface, therewith creating the situation that food uptake takes place close to the water surface. A stressful situation arises due to (i) the high density of fish around the "feeding spots" close to the water surface and (ii) the high light intensity. Also, food that is not consumed at the surface is lost, i.e. it sinks to the bottom of the cage, because it can no longer be observed at greater depths.

Consequently, several devices and methods using light sources to improve the food uptake by fish and to reduce the stress in fish in such environments have been developed.

U.S. Pat. No. 5,732,655 discloses an automatic feeding apparatus for aquatic life using an image acquisition device for taking an image at the surface of the water. Illuminating means are installed behind a transparent material and the image acquisition apparatus is installed at the opposite end. The illuminating means uniformly illuminates the fish and increases the contrast of images captured by the image acquisition apparatus. The image acquisition means can take an image of the dark fish against a bright background. Image processing means are applied to calculate an activity level of the fish and a feeding amount and feeding time are controlled based on the calculated activity level.

SUMMARY OF THE INVENTION

The applicants have found that increasing the visibility of the food across a larger volume of the water cage can improve the food uptake by fish and reduce stress in fish because a high fish density near the water surface during feeding can be avoided.

To that end, in one aspect, an illumination system is disclosed for cultivation of aquatic animals in a volume of water wherein a feeding system defines a feeding axis in the volume of water. The system comprises at least a first illumination surface positioned in the volume of water and arranged for illuminating the feeding axis. The system also comprises a second illumination surface positioned in the volume of water and arranged for illuminating the feeding axis. The first illumination surface and second illumination surface are different surfaces arranged to illuminate the feeding axis from substantially different directions.

Another aspect of the disclosure relates to an arrangement for the cultivation of aquatic animals, wherein the arrangement comprises an illumination system according to the above paragraph, a feeding system and a water enclosure, wherein the first illumination surface and second illumination surface are arranged in the volume of water of the water enclosure. In the context of this disclosure, a water enclosure may for example be a fresh water tank or a sea cage as used in the aquaculture industry. A water enclosure herein is therefore not limited to a closed, contained environment.

Yet another aspect of the disclosure involves a method for cultivating aquatic animals wherein the animals are comprised in a volume of water. The method comprises illuminating a feeding axis in a volume of water with a first illumination surface positioned in the volume of water and illuminating the feeding axis with a second illumination surface positioned in the volume of water. The first illumination surface and the second illumination surface are different surfaces arranged to illuminate the feeding axis from substantially different directions.

The above aspects provide for an illumination system wherein the volume wherein that food can be observed by aquatic animals is increased as a result of the placement of illumination surfaces at least partly around the feeding axis. The arrangement of the illumination surfaces can be adapted relative to the feeding axis in the water cage. Beside illuminating the food, the illumination surfaces may also provide contrast surfaces allowing the aquatic animals to observe dark food against a bright background of the illumination surfaces.

It the context of this disclosure, the feeding axis is the axis defining the overall average travelling direction of the food in the volume of water after having been dispensed from and/or spread by the feeding system. For example, if food is provided from the surface of the water, the food is dispersed in the volume of water along an overall average travelling direction of the food at least partially downward due to gravity force. Food may also be injected into the volume of water from the bottom of the water enclosure using a water/air jet, in which case the food follows a partially upward feeding direction.

An illumination surface is defined as a surface of a structural component, which surface is adapted to emit light. The structural component may contain one or more optical elements for generating light such as one or more artificial light sources, e.g. light emitting diodes. The optical elements may, alternatively or in addition to the light sources, also comprise passive optical elements, such as mirrors, diffusers or light guides, for directing and/or spreading the light for providing an appropriate background against which the food can be shown in contrast.

It should be noted that illumination surfaces are not limited to flat surface and that curved surface are also included. In embodiments, a curved illumination surface may be construed from various flat illumination surfaces. The normal of a surface points away from the illuminated side of the surface.

In an embodiment, the first illumination surface is defined by a first normal and the second illumination surface is defined by a second normal. A normal to an illumination surface is defined as a vector at a position on that surface that is perpendicular to that surface and pointing away from the surface in the direction of the illumination i.e. the light emission. The position on the illumination surface where the normal is considered may for example be the geometric center or centroid of the illumination surface. In the embodiment, the second normal is pointing in a direction different from the first normal, and the first illumination surface and the second illumination surface are arranged such that a first normal of the first illumination surface and a second normal of the second illumination surface cross or intersect within the volume of water, optionally substantially at the feeding axis. In such an embodiment, the illumination surfaces are preferably arranged to at least partly surround the fish and illuminate the feeding axis such that observation of the food, by the fish, from various directions or at different positions in the water cage is improved. In particular, an embodiment is disclosed wherein the illumination system comprises a plurality of illumination surfaces arranged in the volume of water, wherein the plurality of illumination surfaces are arranged at a plurality of polar coordinate angles with respect to the feeding axis as the pole of the coordinate system. In one embodiment the illumination surfaces may be arranged along a boundary of the water enclosure.

In an embodiment, the first illumination surface and the second illumination surface are part of a boundary defining the water enclosure. Integration of the one or more illumination surfaces in the boundary is efficient (e.g. in relation to the wiring for the light sources that can be integrated in constructional features of the boundary) and does not require additional space.

In an embodiment, the illumination system comprises one or more components, the one or more components providing the first illumination surface and the second illumination surface, wherein the one or more components contain light emitting diodes for generating the light emitted from the illuminating the surface. Light emitting diodes are preferred light sources for a variety of reasons, including size, power consumption and cost.

In an embodiment, the illumination system comprises at least one of a temperature sensor and an optical light sensor. Temperature sensors may be connected to a software module or a controller for controlling the light emitted from the illumination surfaces, in dependence on the sensed temperature. The temperature sensor may for example measure a water temperature, an ambient air temperature, a temperature of the illumination surface etc. One example includes dimming or boosting the light intensity when the water temperature reaches a particular value. Optical light sensors may be connected to a software module or a controller for controlling the light emitted from the illumination surfaces in dependence on the sensed light. The sensed light may comprise at least one of ambient light penetrating through the volume of water and a light originating from the illumination surfaces. The sensed valued may control at least one optical characteristic of the emitted light from the illumination surface(s) such as intensity, spectrum, light emitting area, etc.

In an embodiment the first illumination surface and second illumination surface are provided at a depth greater than 1 meter below a water surface of the volume of water. The illumination surfaces may e.g. be provided down to a depth of 5 meter, 10 meter or completely down to the bottom of the water enclosure. Providing illumination surfaces at greater depths below the water surface reduces the tendency of fish moving to the water surface during feeding and hence reduces fish density close to the water surface and, accordingly, reduces stress and improves fish welfare.

In an embodiment, the illumination system comprises one or more first illumination surfaces extending in a depth direction of the volume of water and parallel to the feeding axis and one or more second illumination surface extending in a depth direction of the volume of water and parallel to the feeding axis, wherein respective first and second illumination surfaces may be arranged around the feeding axis at substantially the same depth. A controller is provided configured for controlling light sources of the illumination system such that one or more optical characteristics of the light provided from the one or more first illumination surfaces and the one or more second illumination surface vary in the direction along the feeding axis. For example, the spectrum provided by the illumination surfaces at greater depth may be different from the spectrum provided by the illumination surfaces close to the water surface (e.g. because the penetration of red light through the water is usually less than it is for blue or green light). In an embodiment, the controller is configured for controlling the light sources such that the optical characteristics of light provided from the one or more first illumination surfaces and one or more second illumination surfaces are substantially equal at substantially the same depth in the depth direction of the volume of water. In this manner, the optical characteristics of the light emitted by the illumination surfaces at substantially the same depth is substantially identical irrespective of the horizontal viewing direction of the fish at that depth.

As mentioned above, the first illumination surface and the second illumination surface may be configured for providing direct illumination or contrast illumination of the food around the feeding axis. Whether the effect of increase visibility of the food is provided from direct illumination or contrast illumination may be dependent on the characteristics of the food and environmental conditions. E.g. visibility of dark food may be increased using contrast illumination.

In an embodiment, the first illumination surface and the second illumination surface are rectangular surfaces extending parallel to the feeding axis. Such illumination surfaces prolong the time during which the food is visible to the fish, as the food moves in the direction of the feeding axis.

It is noted that the invention relates to all possible combinations of features recited above. Thus, all features and advantages of one of the above-disclosed aspects likewise applies to any of the other disclosed aspects.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
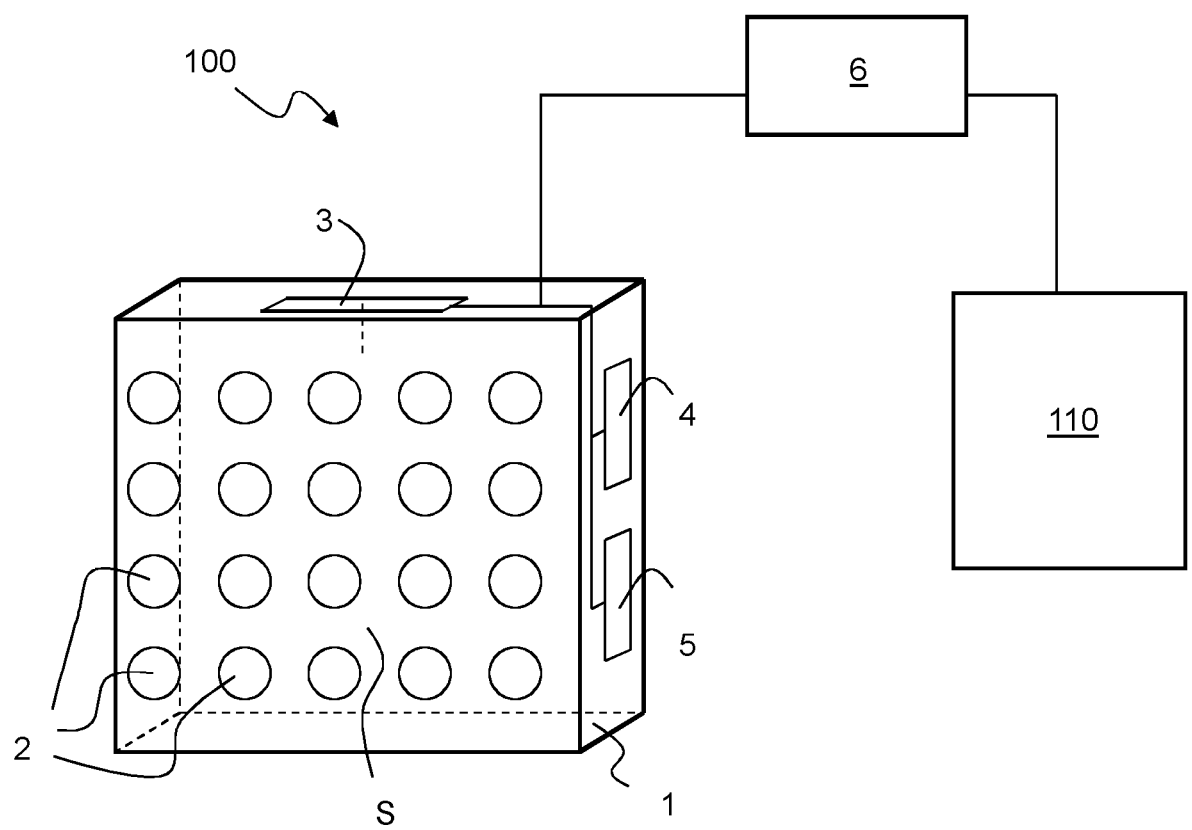
FIG. 1 is a schematical illustration of an illumination surface of an illumination system, wherein the illumination surface is controlled from a controller, and a feeding system.

Embodiments of the illumination system will now be described more fully hereinafter with reference to the accompanying drawings. The illumination system may, however, be embodied in many different forms and the scope of protection should not be construed as limited to the embodiments set forth herein; rather, these embodiments are provided for thoroughness and completeness, and to fully convey the scope of the disclosure to the skilled addressee. Like reference characters refer to like elements throughout.

Figure 4:
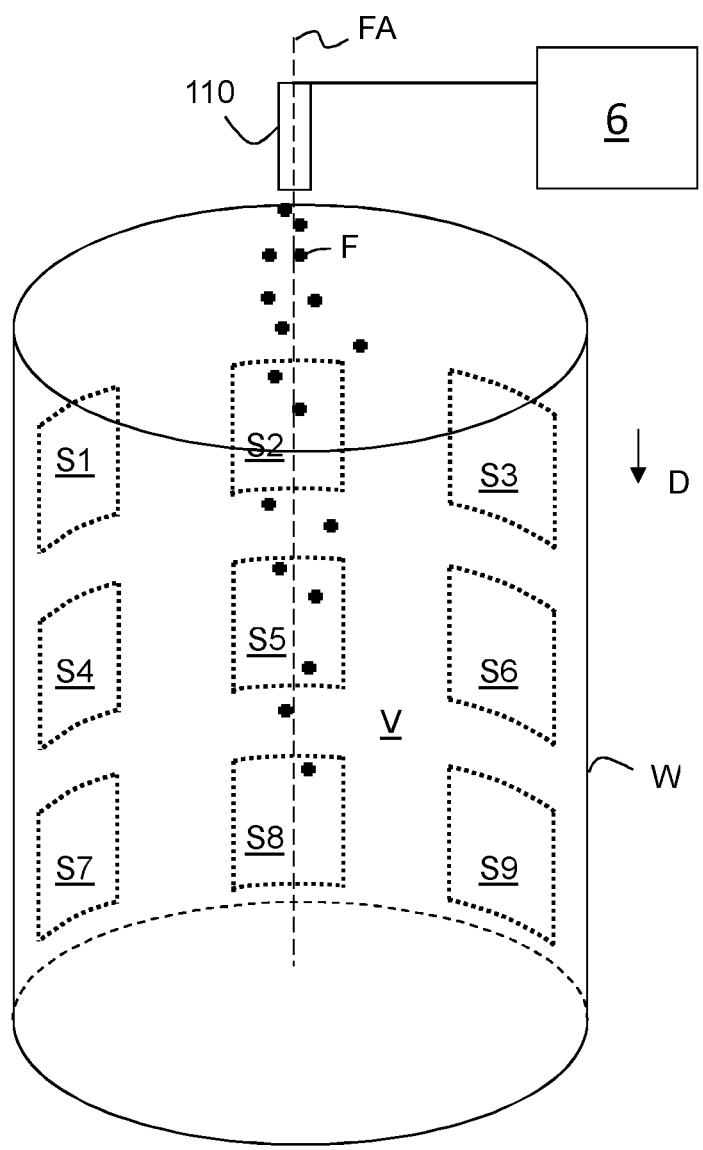
FIG. 4 is a schematical illustration of an arrangement comprising an illumination system, a water cage and a feeding system.

FIG. 1 is a schematical illustration of an illumination panel 1 of illumination system 100, the illumination panel 1 comprising an illumination surface S. Illumination panel 1 further comprises one or more light emitting diodes (LEDs) 2 that can be driven from one or more drivers 3 to emit light in order to obtain a light emitting illumination surface S. LEDs 2 may be embedded in a substrate in a manner known as such. The size of the panels may e.g. be in the range of 0.5-5 m2. Panels may have any shape, e.g. square or rectangular. Panels may comprise any type of illumination surface for providing an illumination area. In FIG. 1, the panel is shown to provide a flat illumination surface. In FIG. 4, curved illumination surfaces are shown. In addition, illumination panel 1 comprises a temperature sensor 4 and an optical light sensor 5.

The illumination system 100 further comprises a controller 6 configured to control the light emitted by the LEDs 2 by means of control signals to generate the illuminating surface S. Controller 6 may control optical characteristics of the light emitted by the LEDs 2, such as light intensity and/or spectrum.

Control signals of controller 6 may be determined in dependence on the input of one or more sensors, such as temperature sensor 4 and/or optical sensor 5. Temperature sensors may be connected to a software module or a controller regulating optical characteristics (such as light intensity and/or spectrum) of the light emitted from the illumination surfaces in dependence on the sensed temperature. Optical light sensors may be connected to a software module or a controller regulating optical characteristics (such as light intensity and/or spectrum) of the light emitted from the illumination surfaces in dependence on the sensed light. When submersed into the volume of water, the temperature sensors measures water temperature and the light sensor measures at least one of ambient light components that have penetrated through the volume of water and light originating from the illumination surfaces and diffused/scattered through the volume of water.

An arrangement comprising the illumination system 100 may further be linked to a feeder system 110 arranged for feeding food to the fish in a volume of water, as will be further described below. Feeder system 110 may be controlled from controller 6 such that illumination from illumination panels 1 and feeding from the feeder system 100 can be tuned to each other. Alternatively the feeder system 110 may provide signals to the controller 6 for controlling the illumination from illumination panels 1 synchronized with the operation of the feeding system 110 e.g. the dispensing of food pallets in the volume of water.

Figure 2A:
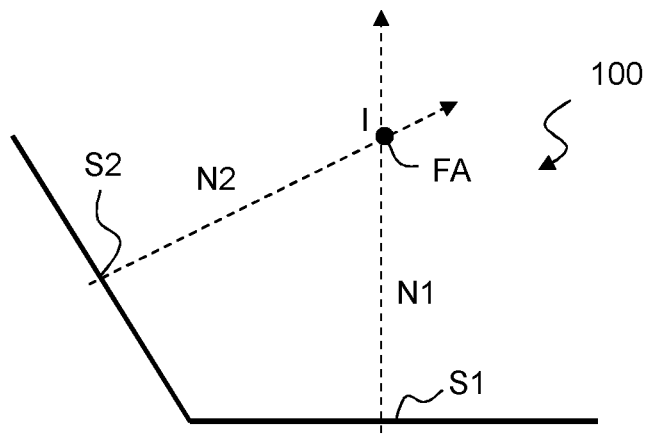
FIGS. 2A and 2B are schematical illustrations of illumination systems comprising first and second illumination surfaces.
Figure 2B:
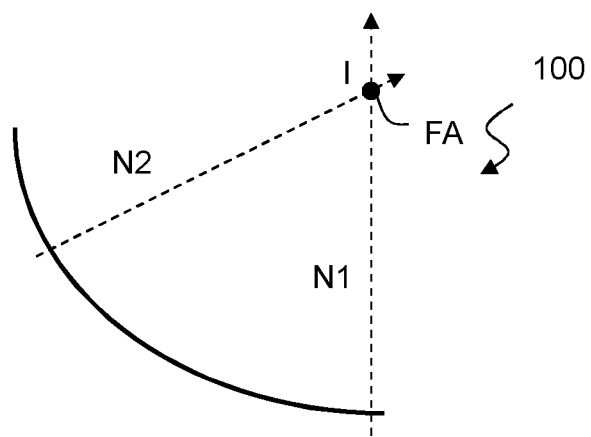

FIGS. 2A and 2B are basic illustrations of illumination systems 100 in two embodiments.

The illumination system 100 of FIG. 2A comprises a first illumination surface S1 and a second illumination surface S2 arranged to illuminate a feeding axis FA from substantially different directions. In particular, first illumination surface S1 may be defined by a normal N1 and a second illumination surface S2 likewise may be defined by a normal N2. Illumination surfaces S1, S2 are surfaces of one or more panels comprising one or more light sources (not shown), such as LEDs. The illumination surfaces S1, S2 are arranged at an angle, such that the normals N1 and N2 point in different directions, but substantially in directions of a feeding axis FA. In the embodiment of FIG. 2A, the normals N1 and N2 intersect at an intersection point I and the intersection point I lies on the feeding axis FA in the volume of water. The skilled person will understand that such a perfect geometrical situation is not likely to occur in practice and that deviations may occur as long as the aim of arranging omnipresent illumination surfaces substantially around a virtual feeding axis is obtained.

The illumination system 100 of FIG. 2B also comprises a curved illumination surface. The curved surface may have different normals (N1, N2) pointing in different directions, with the different normals directing towards the same feeding axis. Alternatively the curved illumination surface may be construed from a plurality of flat surfaces arranged so as to create the curved surface. This alternative construction provides an 'overall curved' illumination surface, as shown in FIG. 2B, arranged as an 'assembly of flat' illumination (sub)surfaces, as shown in FIG. 2A.

Since the first and second illumination surfaces S1, S2 illuminate the feeding axis FA from different directions, the direct illumination of the food is improved. Furthermore, since the first and second illumination surfaces S1, S2 are arranged within a volume of water at different polar coordinate angles relative to the feeding axis FA, the contrast illumination of the food is improved. Whether the fish observes the food in direct illumination or in contrast illumination depends on (i) the viewing direction of fish i.e. the position of the fish relative to the feeding axis FA and relative to the illumination surfaces S1, S2 and (ii) the lighting intensity and distance of the illumination surfaces relative to the feeding axis i.e. the ability to illuminate the food pallets. The closer the illumination surfaces are arranged to the feeding axis or the higher the light intensity, the more direct illumination is available; the further away the illumination surfaces are arranged from the feeding axis or the lower the light intensity, the more contrast illumination is used. With a distributed illumination system 100 comprising multiple illumination surface arranged as described herein, a system is obtained wherein fish has improved visibility of the food F from different viewing angles due to either direction illumination of contrast illumination of the food. Contrast illumination is schematically illustrated in FIG. 3.

Figure 3:
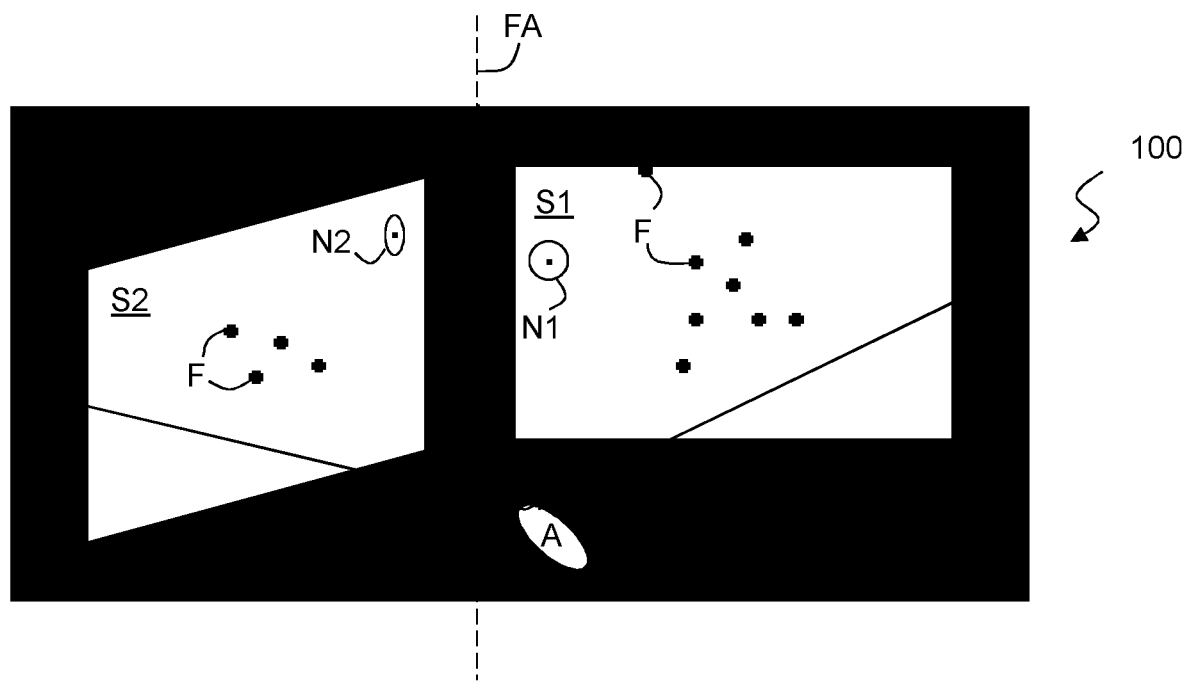
FIG. 3 provides a schematic picture of the contrast effect of the illumination surfaces of an illumination system for improved food visibility.

In FIG. 3, the illumination surfaces S1, S2 are arranged such that normals to the illumination surfaces are directed towards the feeding axis FA. The surfaces emit light which is illustrated by the white appearance of the surfaces S1, S2. The water in the volume V is dark, as illustrated by the black rectangle. Clearly, the dark food F is observed by animal A in the volume of water as soon as the food F is in between the animal A and the 'highlighted' background surfaces S1, S2 arranged around the feeding axis FA, when of course the aquatic animal A is looking in the direction of one of the 'highlighted' background surfaces S1, S2. The larger the envelop of the illumination surfaces S1, S2 around the feeding axis is, the less dependent the visibility of the food F is on the viewing direction of the animal A.

FIG. 4 is a schematic illustration of an arrangement comprising a water enclosure W, e.g. a sea cage, containing a volume V of water and a plurality of illumination surfaces S1-S9. Illumination surfaces S1, S4, S7 are arranged at different depths in a direction along a feeding axis FA of the water enclosure. The same holds for illumination surfaces S2, S5, S8 and for illumination surfaces S3, S6, S9, respectively. Surfaces S1-S3 are arranged closely beneath the water surface at substantially the same depth beneath the water surface. The surfaces may e.g. extend over the first meter below the water surface in the depth direction. Surfaces S4-S6 are arranged at greater depths (e.g. in the range between 1 and 5 meters below the water surface) and surfaces S7-S9 are arranged at further depths (e.g. in the range between 2 and 10 meters below the water surface). In the embodiment of FIG. 4, surfaces S1-S9 are arranged as curved components that constitute an integral part of the wall of water enclosure W.

The illumination system 100 comprises a controller 6. Wiring of the controller 6 with each of the illumination surfaces is not shown in FIG. 4 for clarity purposes. Controller 6 is also connected to feeding system 110.

Controller 6 is configured for controlling light sources (not shown) of the illumination system 100 such that one or more optical characteristics of the light provided from the one or more first illumination surfaces S1, S4, S7 and the one or more second illumination surfaces S2, S5, S8 varies in the depth direction D of the volume V of water. For example, the spectrum of the illuminated surfaces at a greater depth along feeding axis FA may be different from the spectrum of the illuminated surfaces closer to the water surface. The illumination spectrum from the illumination surfaces at greater depth below the water surface may e.g. have increased amounts of red and yellow light to compensate for the absorption of these spectral components from the ambient light by the water volume closer to the water surface.

Controller 6 is configured for controlling the light sources such that the optical characteristics of light provided from the first illumination surface S1, the second illumination surfaces S2 and the further illumination surface S3 are substantially equal, since these surfaces are at substantially the same depth in the depth direction. In this manner, the optical characteristics of illumination surfaces at substantially the same depth are substantially identical independent of the viewing direction of the fish in a horizontal plane at that depth.

Temperature sensors 4 and optical light sensors 5, described with respect to FIG. 1, can be used to the advantage in water enclosure W. Temperature sensors 4 can indicate at which depths the temperature is most optimal for animals A to dwell and where it is most likely the reside. Controller 6 can activate and control illumination surfaces S at the corresponding depths to enhance visibility of the food at these depths. Light sensors 5 can be used to control the optical characteristics of the illuminated surfaces S1-S9. E.g., generally less daylight will be present at greater depths, such that the light intensity for illumination surfaces S4-S6 will be higher than the light intensity for illumination surfaces S1-S3. Similarly, certain spectral components may be absorbed by water more than others and controller 6 may control the spectrum to compensate for the absorbed spectral components. Controller 6 may be operationally linked to feeder device 110 and control the illumination surface in synchronicity with a feeding activity. Either the feeder 110 can provide control signals to the controller 6 when feeding is active, or the controller 6 provides control signals to the feeder device to indicate when the illumination surfaces are controlled to support feeding activity.

Whereas the embodiments of FIGS. 2A, 2B, 3 and 4 each show only a partial 'illumination envelope' around the feeding axis, alternative embodiments have been envisaged comprising for example substantially full-surround illumination.

Figure 5:
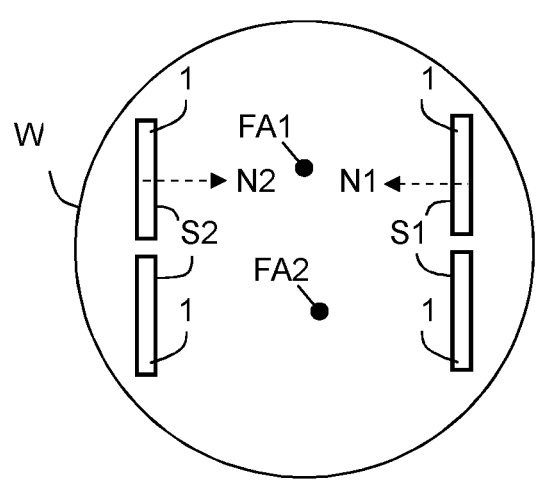
FIG. 5 is an alternative arrangement comprising an illumination system having first and second illumination surfaces.

It is also not necessary for an arrangement to have only one feeding axis FA around which illumination surfaces are provided. In FIG. 5, panels 1 providing illumination surfaces S1, S2 are arranged around two feeding axes FA1, FA2 and provide contrasting illumination for food dispensed along both feeding axes. The illumination surfaces are enveloping both feeding axes.

The person skilled in the art realizes that the present invention by no means is limited to the preferred embodiments described above. On the contrary, many modifications and variations are possible within the scope of the appended claims.

The invention claimed is:

1. A system for illumination of aquatic animal food which has been dispensed into a volume of water, the system comprising:
    a feeding system, external to the volume of water, for dispensing food for the aquatic animals into the volume of water, whereby the food, once in the volume of water, travels in an overall average travelling direction, said overall average travelling direction defining a feeding axis in the volume of water;
    a first illumination surface positioned in the volume of water and arranged to illuminate the feeding axis, the first illumination surface for emitting a first light in a first direction towards the feeding axis;
    a second illumination surface positioned in the volume of water and arranged to illuminate the feeding axis, the second illumination surface for emitting a second light in a second direction towards the feeding axis;
    wherein the first illumination surface and the second illumination surface are different surfaces and are arranged to emit light towards the feeding axis from substantially different directions; to thereby illuminate the food as the food travels in the direction of the feeding axis; and,
    wherein the volume of water has an air surface and wherein the feeding axis is substantially normal to the air surface.

2. The system according to claim 1, wherein the first illumination surface is defined by a first normal and the second illumination surface is defined by a second normal pointing in a direction different from the first normal and wherein the first illumination surface and the second illumination surface are secured such that a first normal of the first illumination surface and a second normal of the second illumination surface cross or intersect within the volume of water, substantially at the feeding axis.

3. The system according to claim 1, wherein the illumination system comprises a plurality of illumination surfaces arranged in the volume of water, wherein the plurality of illumination surfaces are arranged at a plurality of polar coordinate angles with respect to the feeding axis, e.g. along a boundary of the volume of water.

4. The system according to claim 1, wherein the first illumination surface and the second illumination surface are part of a wall at least partly surrounding the volume of water.

5. The system according to claim 4, wherein the illumination system comprises one or more components, the one or more components providing the first illumination surface and the second illumination surface, wherein the one or more components contain one or more light emitting diodes.

6. The system according to claim 4, wherein a first component comprises the first illumination surface and a second component, separate from the first component, comprises the second illumination surface.

7. The system according to claim 6, wherein the illumination system comprises one or more components, the one or more components comprising at least one of a temperature sensor and an optical light sensor.

8. The system according to claim 7, wherein the first illumination surface and second illumination surface are provided at a depth greater than 1 meter below a water surface of the volume of water.

9. The system according to claim 1, comprising one or more first illumination surfaces extending in a depth direction along the feeding axis and one or more second illumination surfaces extending in a depth direction along the feeding axis, wherein the illumination system further comprises a controller configured for controlling light sources such that one or more optical characteristics of the light emitted from the one or more first illumination surfaces and the one or more second illumination surface vary in the direction along the feeding axis defined in the volume of water.

10. The system according to claim 9, wherein the controller is configured for controlling the light sources such that the optical characteristics of light emitted from the one or more first illumination surfaces and the one or more second illumination surfaces are substantially equal at substantially the same depth in the volume of water.

11. The system according to claim 9, wherein the first illumination surface and the second illumination surface are configured for providing direct illumination or contrast illumination of the food dispensed along the feeding axis.

12. The system according to claim 9, wherein the first illumination surface and the second illumination surface are rectangular surfaces extending parallel to the feeding axis.

13. An arrangement for cultivation of aquatic animals, said arrangement comprising a system according to claim 9 and
a food dispenser for dispensing food into the volume of water along the feeding axis; and
a water enclosure wherein the illumination system is arranged to illuminate the first and second illumination surface in the water enclosure and wherein the first illumination surface and the second illumination surface are arranged in the volume of water of the water enclosure.

14. The arrangement according to claim 13, wherein the system comprises a controller adapted to control optical characteristics of light provided from the first and second illumination surface in accordance with the food dispensing.

15. The system according to claim 1, wherein at least one of the first direction and the second direction is substantially perpendicular to the feeding axis.

16. A method for illuminating aquatic animal food which has been dispensed into a volume of water, the method comprising the steps of:

dispensing food into the volume of water by a feeding system that is external to the volume of water, whereby the food, once in the volume of water, travels in an overall average travelling direction, said overall average travelling direction defining a feeding axis in the volume of water;

emitting a first light in a first direction towards the feeding axis from a first illumination surface positioned in the volume of water;

emitting a second light in a second direction towards the feeding axis from a second illumination surface positioned in the volume of water;

wherein the first illumination surface and the second illumination surface are different surfaces arranged to emit the first light and the second light towards the feeding axis from substantially different directions; to thereby illuminate the food as the food travels in the direction of the feeding axis; and, wherein the volume of water has an air surface and wherein the feeding axis is substantially normal to the air surface.

17. The arrangement according to claim 14, wherein the controller is further adapted to control the food dispenser in dispensing food.

* * * * *